US011248526B2

(12) United States Patent
Tajiri et al.

(10) Patent No.: US 11,248,526 B2
(45) Date of Patent: Feb. 15, 2022

(54) FAN CASING ASSEMBLY AND METHOD

(71) Applicant: Unison Industries, LLC, Jacksonville, FL (US)

(72) Inventors: Gordon Tajiri, Allentown, PA (US); Michael Thomas Kenworthy, Chandler, AZ (US); Yanzhe Yang, Mason, OH (US); Dattu G. V. Jonnalagadda, Andra Pradesh (IN); Elizabeth Diane Turner, West Chester, OH (US)

(73) Assignee: Unison Industries, LLC, Jacksonville, FL (US)

( * ) Notice: Subject to any disclaimer, the term of this patent is extended or adjusted under 35 U.S.C. 154(b) by 216 days.

(21) Appl. No.: 16/328,743

(22) PCT Filed: Aug. 28, 2017

(86) PCT No.: PCT/US2017/048791
§ 371 (c)(1),
(2) Date: Feb. 27, 2019

(87) PCT Pub. No.: WO2018/048649
PCT Pub. Date: Mar. 15, 2018

(65) Prior Publication Data
US 2019/0195132 A1 Jun. 27, 2019

(30) Foreign Application Priority Data
Sep. 8, 2016 (IN) .............................. 201641030682

(51) Int. Cl.
*F02C 7/18* (2006.01)
*F28D 1/02* (2006.01)
(Continued)

(52) U.S. Cl.
CPC .............. *F02C 7/18* (2013.01); *F28D 1/0246* (2013.01); *F28F 3/048* (2013.01); *F28F 7/02* (2013.01);
(Continued)

(58) Field of Classification Search
CPC .......... F28F 7/02; F28F 3/048; F28F 2255/04; F28F 2280/10; F28F 2280/105;
(Continued)

(56) References Cited

U.S. PATENT DOCUMENTS 7,372,348 B2 * 5/2008 Xu ........................... F03G 7/065
335/78
7,926,261 B2 4/2011 Porte
(Continued)

FOREIGN PATENT DOCUMENTS

CN 101149028 A 3/2008
CN 101200220 A 6/2008
(Continued)

OTHER PUBLICATIONS

Chinese Patent Office, Office Action re Corresponding Application No. 20170055303.5, dated Nov. 30, 2020, 8 pages, China.
(Continued)

*Primary Examiner* — Tho V Duong
(74) *Attorney, Agent, or Firm* — McGarry Bair PC

(57) ABSTRACT

A fan casing assembly, connection assembly and method for moving a fan casing cooler. The fan casing assembly for the turbine engine can include an annular fan casing with a peripheral wall having a flow path defined through the casing. A fan casing cooler can mount along the peripheral wall in order to confront a cooling fluid flow within the flow path in order to cool a fluid through the fan casing cooler.

9 Claims, 8 Drawing Sheets

(51) Int. Cl.
*F28F 3/04* (2006.01)
*F28F 7/02* (2006.01)
*F28D 21/00* (2006.01)

(52) U.S. Cl.
CPC .... *F05D 2260/213* (2013.01); *F05D 2270/42* (2013.01); *F05D 2300/505* (2013.01); *F28D 2021/0021* (2013.01); *F28D 2021/0026* (2013.01); *F28F 2255/02* (2013.01); *F28F 2255/04* (2013.01); *F28F 2280/10* (2013.01); *F28F 2280/105* (2013.01); *Y02T 50/60* (2013.01)

(58) Field of Classification Search
CPC ............... F28F 27/02; F28F 2013/006; F28F 2013/001; F28F 13/06; F28F 2255/02; F28D 1/0246; F28D 2021/0021; F28D 2021/0026; F28D 2260/213; F02C 7/20; F02C 7/18; F02C 7/14; F02C 7/141; F02C 7/32; F01D 25/26; F01D 25/28; F05D 2270/42; F05D 2300/505; F05D 2260/213; Y02T 50/60

See application file for complete search history.

(56) References Cited

U.S. PATENT DOCUMENTS

| | | | |
|---|---|---|---|
| 8,166,768 B2 | 5/2012 | Birch et al. | |
| 8,291,710 B2* | 10/2012 | Webster | F02K 1/12 60/771 |
| 8,561,386 B2* | 10/2013 | Mons | F02C 7/12 60/266 |
| 8,601,792 B2 | 12/2013 | Mylemans | |
| 10,125,684 B2* | 11/2018 | Yu | F02C 3/04 |
| 10,208,621 B2* | 2/2019 | Hoefler | F01D 25/12 |
| 2007/0215326 A1* | 9/2007 | Schwarz | F02C 7/12 165/96 |
| 2008/0095611 A1* | 4/2008 | Storage | F02C 7/14 415/116 |
| 2009/0223648 A1* | 9/2009 | Martin | F28F 27/00 165/86 |
| 2010/0155016 A1* | 6/2010 | Wood | F02C 7/12 165/51 |
| 2011/0185731 A1* | 8/2011 | Mylemans | F02C 7/224 60/645 |
| 2013/0154169 A1 | 6/2013 | Myers et al. | |
| 2013/0247587 A1 | 9/2013 | Lo | |
| 2013/0255931 A1 | 10/2013 | Arnett et al. | |
| 2014/0138367 A1* | 5/2014 | Zhang | C22C 38/04 219/137 WM |
| 2015/0041109 A1 | 2/2015 | Zager et al. | |
| 2015/0135726 A1 | 5/2015 | Hundley, Jr. et al. | |

FOREIGN PATENT DOCUMENTS

| | | |
|---|---|---|
| CN | 101272951 A | 9/2008 |
| EP | 3023724 A1 | 5/2016 |

OTHER PUBLICATIONS

International Search Report and Written Opinion dated Nov. 16, 2017 which was issued in connection with PCT/US17/48791 which was filed on Aug. 28, 2017.

* cited by examiner

FAN CASING ASSEMBLY AND METHOD

FIELD OF THE INVENTION

The present disclosure related to turbine engines, and, more particularly, to a fan casing assembly.

BACKGROUND OF THE INVENTION

Contemporary engines used in aircraft produce substantial amounts of heat that must be transferred away from the engine in one way or another. Heat exchangers provide a way to transfer heat away from such engines. For example, heat exchangers can be arranged in a ring about a portion of the engine.

Oil can be used to dissipate heat from engine components, such as engine bearings, electrical generators, and the like. Heat is typically transferred from the oil to air by air-cooled oil coolers, and more particularly, surface air-cooled oil cooler systems to maintain oil temperatures at a desired range from approximately 100° F. to 300° F. In many instances, an environment can be as low as −65° F.

Heat exchangers such as surface air-cooled oil coolers can be placed in a turbine jet engine fan case, using bypass air to remove lube oil energy through forced convection. The coolers can include a plurality of fins through which to achieve the forced convection. The fin geometry and height with respect to the airflow velocity are critical parameters for the transfer of energy and are sized for a maximum engine load. During non-peak demand conditions, the cooler is thermally oversized and is not optimized to minimize aerodynamic drag.

SUMMARY OF THE INVENTION

In one aspect, the present disclosure relates to a fan casing assembly including an annular fan casing having a peripheral wall defining a longitudinal axis and a flow path extending along the longitudinal axis. A fan casing cooler includes a first surface confronting the peripheral wall and has a first end spaced from a second end, with opposing forward and aft edges. A connection assembly mounts the fan casing cooler to the annular fan casing. The connection assembly includes at least one thermally sensitive connector configured to passively position the fan casing cooler into the flow path in response to a change in a thermal condition.

In another aspect, the present disclosure relates to a connection assembly for mounting a fan casing cooler to an annular casing. The connection assembly includes at least one thermally sensitive connector configured to change shape in response to a change in thermal condition.

In yet another aspect, the present disclosure relates to a method of moving a fan casing cooler within an annular passage defined by a fan casing assembly of an aircraft engine including passively positioning the fan casing cooler in the annular passage when a first reference temperature is reached. The passive positioning includes a thermally sensitive connector operably coupled to the fan casing cooler changing shape in response to a change in a thermal condition.

DESCRIPTION OF EMBODIMENTS OF THE INVENTION

Embodiment disclosed herein relate to a fan casing cooler, such as a surface air-cooled oil cooler, and more particularly to passively positionable surface cooler in an engine such as an aircraft engine. The exemplary surface coolers can be used for providing efficient cooling. Further, the term "surface coolers" as used herein can be used interchangeably with the term "heat exchangers." As used herein, the surface coolers are applicable to various types of applications such as, but not limited to, turbojets, turbo fans, turbo propulsion engines, aircraft engines, gas turbines, steam turbines, wind turbines, and water turbines.

Current surface coolers are static structures, typically extending into an airflow path to transfer heat from the surface coolers by means of forced convection. The surface coolers can include a set of fins extending into the airflow path to confront an airflow. The fins geometry with respect to the airflow velocity is critical for determining and maximizing the transfer of energy. The fins are sized for maximum engine load condition during peak demand conditions. During off-peak conditions, the surface coolers and fins are oversized resulting in unnecessary aerodynamic drag, leading to increased specific fuel consumption by the engine. Thus, there is a need to adaptively balance cooling performance with drag in order to improve specific fuel consumption while maintaining sufficient transfer of energy by the surface cooler during peak demand conditions.

Figure 1:
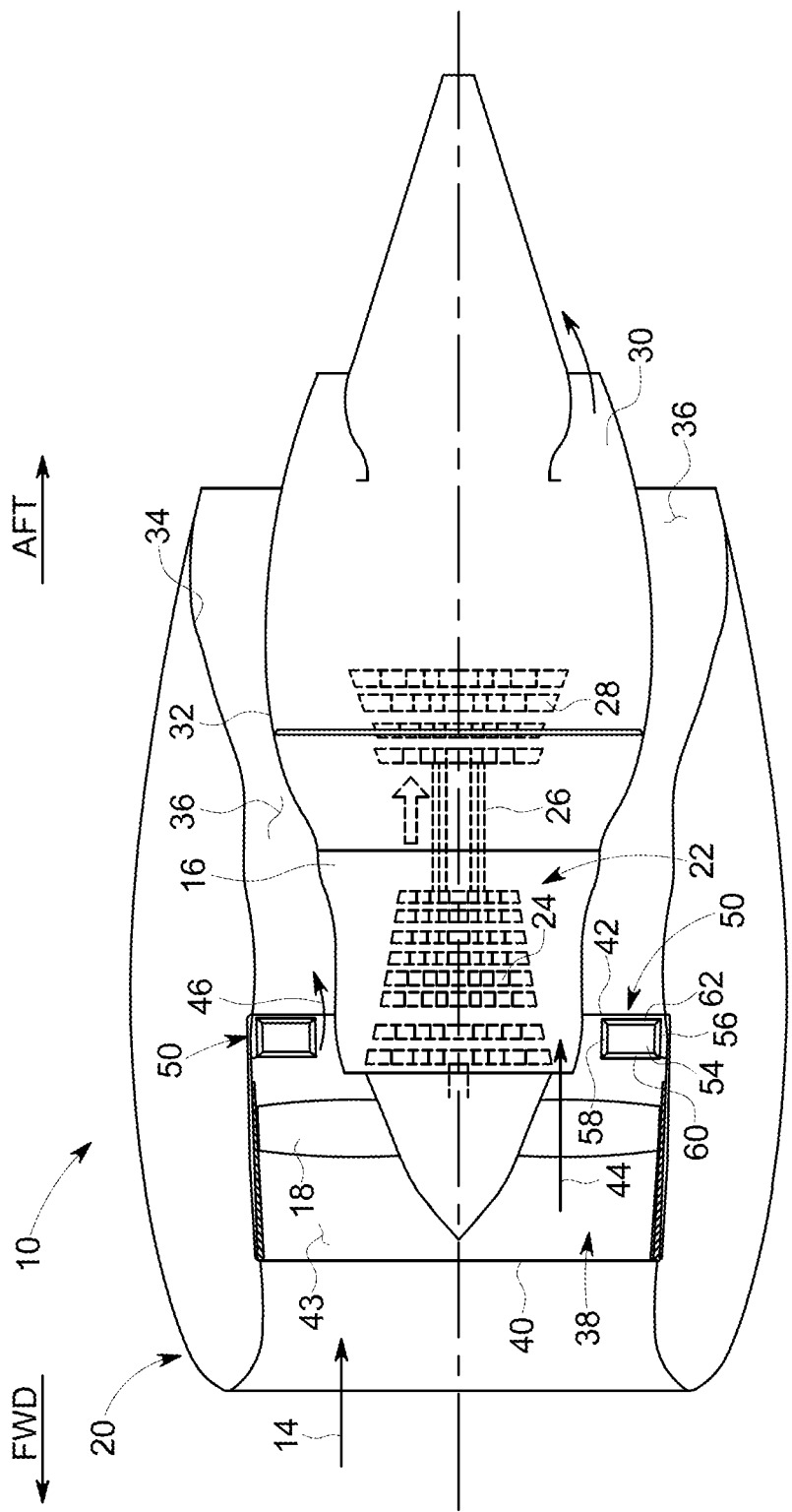
FIG. 1 is a schematic partially cut away view of a turbine engine assembly with a representative finned cooler along an annular fan casing according to an embodiment of the invention.

Aspects of the present disclosure have an improved design that result in optimized engine cooling while reducing drag to improve specific fuel consumption. As the surface cooler can be configured for use in an oil cooling system of an aircraft engine, FIG. 1 provides a brief explanation of the environment in which embodiments of the invention can be used is described. More specifically, FIG. 1 illustrates an exemplary turbine engine assembly 10 having a longitudinal axis 12. A flow path 14 can be defined along the longitudinal axis 12. A turbine engine 16, a fan assembly 18, and a nacelle 20 can be included in the turbine engine assembly 10. The turbine engine 16 can include an engine core 22 having compressor(s) 24, a combustion section 26, turbine(s) 28, and exhaust 30. An inner cowl 32 radially surrounds the engine core 22.

Portions of the nacelle 20 have been cut away for clarity. The nacelle 20 surrounds the turbine engine 16 including the inner cowl 32. In this manner, the nacelle 20 forms an outer cowl 34 radially surrounding the inner cowl 32. The outer cowl 34 is spaced from the inner cowl 32 to form an annular passage 36 between the inner cowl 32 and the outer cowl 34. The annular passage 36 characterizes, forms, or otherwise defines a nozzle and a generally forward-to-aft bypass airflow path. An annular fan casing assembly 38 having an annular forward casing 40 and an aft casing 42 with a peripheral wall 43 can form a portion of the outer cowl 34 formed by the nacelle 20 or can be suspended from portions of the nacelle 20 via struts (not shown).

In operation, air flows through the fan assembly 18 along the flow path 14 and separates into a first portion of the airflow 44 and a second portion of the airflow 46. The first portion of the airflow 44 is channeled through compressor(s) 24 wherein the airflow is further compressed and delivered to the combustion section 26. Hot products of combustion (not shown) from the combustion section 26 are utilized to drive turbine(s) 28 and thus produce engine thrust. The annular passage 36 is utilized to bypass the second portion of the airflow 46 of the airflow discharged from fan assembly 18 around engine core 22.

The turbine engine assembly 10 can pose unique thermal management challenges and a heat exchanger system or surface air-cooled oil cooler such as a fan casing cooler 50 can be attached to the turbine engine assembly 10 to aid in the dissipation of heat. The cooler 50 includes a first surface 52 (FIG. 2) confronting the peripheral wall 43 and a second surface 54 confronting the annular passage 36. The cooler 50 further includes a first end 56 spaced from a second end 58, and opposing forward and aft edges 60, 62. In the exemplary embodiment, the cooler 50 can be operably coupled to the fan casing assembly 38 that forms an interior portion of the outer cowl 34. The cooler 50 can be any suitable cooler or heat exchanger, including an air-cooled oil cooler. While the coolers 50 are illustrated near the aft casing 42, it should be understood that the coolers 50 can be positioned anywhere along the fan casing assembly 38. It is further contemplated that the coolers 50 can be positioned anywhere along the interior of the outer cowl 34 or the exterior of the inner cowl 32 to confront the second portion of the airflow 48 passing through the annular passage 36. Thus, the cooler 50 can couple to the engine assembly 10 at any position along the annular passage 36 defined by the cowls 32, 34.

Figure 2:
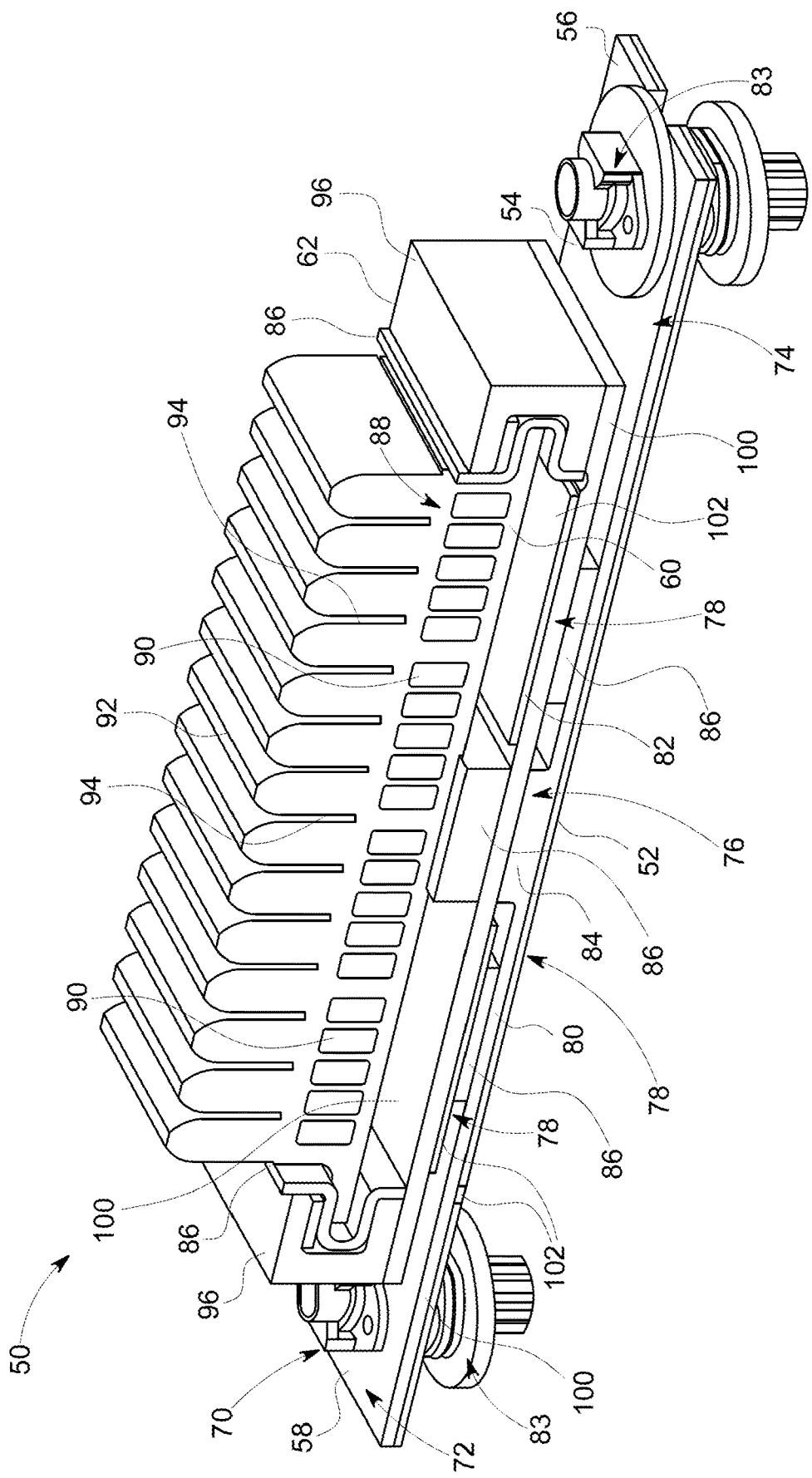
FIG. 2 is a perspective view of a sectioned finned cooler of FIG. 1, according to an embodiment of the invention.

FIG. 2 illustrates one exemplary embodiment of the cooler 50. The cooler 50 includes a connection assembly 70. The connection assembly 70 is configured to mount the cooler 50 to the annular fan casing assembly 38 (FIG. 1). The connection assembly 70 includes at least one thermally sensitive connector 72. The thermally sensitive connector 72, for example, can include a bracket 74 coupling the annular fan casing assembly 38 to the cooler 50. It should be appreciated that the bracket 74 is only one exemplary thermally sensitive connector 72, and that the invention should not be limited to the bracket 74 as shown, but is applicable to any thermally sensitive connector 72 coupling the cooler 50 to the fan casing assembly 38.

The bracket 74 can include a body 76. The body 76 can include one or more sets of layers such as metal layers 78. While it is illustrated that the metal layers 78 are separate elements, it should be appreciated that the metal layers 78 can be integral. The metal layers 78, in non-limiting examples, can include nickel titanium (Ni—Ti) shape memory foils or can includes layers of aluminum or aluminum silicon carbide (AlSiC), or any combination thereof. The metal layers 78 can be formed by additive manufacturing, such as ultrasonic additive manufacturing (UAM) or additive metal deposition, in non-limiting examples, to bond the layers to one another. Any sufficient metal bonding process can be used to laminate the layers in order to produce a monolithic laminate composite metal sheet to form the metal layers 78.

The bracket 74 has been illustrated, by way of non-limiting example, as including a lower plate 80 and an upper plate 82. A set of fasteners 83 can mount the cooler 50 to the aft casing assembly 38 (FIG. 1) at the ends 56, 58 of the body 76 or at the ends of the lower plate 80, by way of non-limiting example. An intermediate section 84 can couple the upper plate 82 to the lower plate 80. The lower and upper plates 80, 82 can be integrally formed with the intermediate section 84, or can couple to one another at the intermediate section 84. The upper and lower plates 80, 82 can also include one or more metal layers 78, such as the Ni—Ti, AlSiC, or any other shape memory foils or metals, similar to that of the bracket 74.

The plates 80, 82 can have multiple separate sheets combined to form the plates 80, 82, including a composite metal sheet, having multiple, layered materials to form the plates 80, 82. Custom metal material tapes can also be utilized. The plates 80, 82 can be made at least partially of thermally sensitive materials, such that the plates 80, 82 can at least partially deform based upon a change in thermal condition, such as an increase or decrease in temperature. In one example, the plates can be a bi-metal or shape-memory alloy plate. Under such an example, the thermal activation of the bi-metal (or shape memory alloy) plate can tuned by appropriate coefficient of thermal expansion material selection and sizing of directly bonded aluminum alloy and aluminum metal matrix composite (MMC), aluminum silicon carbide sheets (AlSiC). For example, the lower plate 80 includes a thermally conductive, malleable layer 100, capable of deformation and reformation, and a thermally actuable, MMC layer 102 extending along the length of the malleable layer 100 that deforms relative to a change in temperature. The upper plate 82 can include a malleable layer 100, with discontinuous MMC layers 102 extending for a portion of the second plate 82. The discontinuous MMC layers 102 can be laminated on the top or bottom of the second plate 82 in forming the second plate, in order to particularly determine the geometric change of the second plate 82. With the discrete MMC layers 102, the second plate 82 can locally change shape based upon a change in temperature, while maintaining the shape of the second plate 82 at areas without the MMC layers 102.

Ultrasonic additive manufacturing (UAM) or other alternative metal bonding/deposition processes can be used to laminate the dissimilar materials to produce a monolithic laminate composite metal sheet to form the plates 80, 82. The dissimilar materials can include the malleable layer 100 and the MMC layer 102, comprised of first and second materials. The first and second materials can include, but are not limited to, a high strength aluminum alloy as the malleable layer 100 and AlSiC as the MMC layer 102. Any suitable materials can be utilized and such material selection creates the temperature dependent internal differential strain. In the above materials example, a bi-metal layer is formed from the layer of aluminum alloy and layer of AlSiC. The volume fraction percentage of silicon carbide (SiC) within the AlSiC can be varied to tune the coefficient of thermal expansion (CTE). Depending on the percentage of SiC, the CTE for AlSiC can vary from 7 to 20 ppm/C, while additional percentages and materials are contemplated from 5 to 35 ppm/C. Such a design can cause actuation or deformation of the plates 80, 82 relative to change in local conditions, and more particularly, temperature. Further still, binary and ternary Ni—Ti shape memory foils can be incorporated as an additional thermal actuation material or in conjunction with MMC foils. These alloys are designed to activate and change shape at specific tunable temperatures. Such shapes can be particularly created based upon the tuning of local percentages of the SiC throughout the plates 80, 82, for example, or other shape memory alloy materials. Additionally, other metal alloy and smart metal material tapes can be utilized.

The alloys and smart metals used can be additively fabricated, such as using the UAM process or additive electroforming, providing for low mass as well as optimization for maximum cooling of the cooler 50. Furthermore, the addition of complex 3D printed kinematic features is possible using a combination of in-situ machining, layered ultrasonic welding, and secondary laser welding.

One or more pads 86 can be positioned between the lower and upper plates 80, 82, spaced from the intermediate section 84. The pads 86 can be made of a thermally conductive elastomeric material or can be made of a knitted metal, 'rubber' mesh, for example. The pads 86 permit flexion, expansion, or contraction of the plates 80, 82 while simultaneously permitting heat transfer. To improve the thermal response of the bracket to changing thermal load conditions, the transient delay can be improved with the addition of the high temperature thermally conductive elastomeric or knitted wire mesh pads 86. These pads 86 act as a vibration damping material when they are compressed during non-peak load conditions.

The cooler 50 can further include an internally channeled manifold 88. The manifold 88 is illustrated as being spaced from the upper plate 82, opposite the lower plate 80. An additional pad 86 can be positioned between the manifold 88 and the upper plate 82 to space the manifold 88 from the upper plate 82. A plurality of channels 90 can be included in the manifold 88 permitting a flow of oil or other fluid through the manifold 88. A plurality of fins 92 can be included on the manifold 88 extending in the direction opposite of the upper plate 82, such as into the annular passage 36 (FIG. 1). The fins 92 define grooves 94 between adjacent fins 92, permitting a volume of air or fluid to pass between the fins 92. A set of mounting rails 96 are disposed on the ends of the upper plate 82 for supporting the manifold 88. Additional thermally conductive compliant interface pads 86 can be disposed between the rails 96 and the manifold 88 for dampening vibratory forces at the ends of the manifold 88.

Figure 3A:
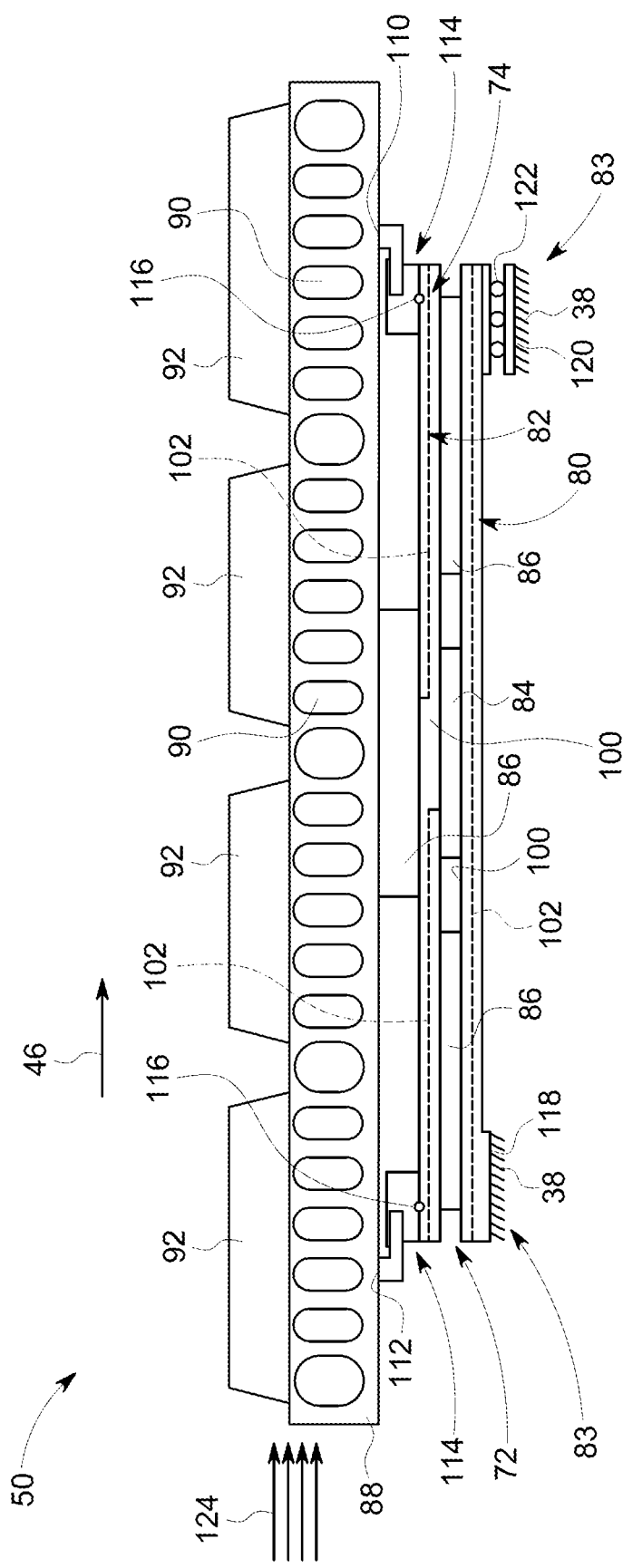
FIG. 3A is a schematic side view of the cooler of FIG. 1 with a thermally sensitive connector in a first position according to an embodiment of the invention.
Figure 3B:
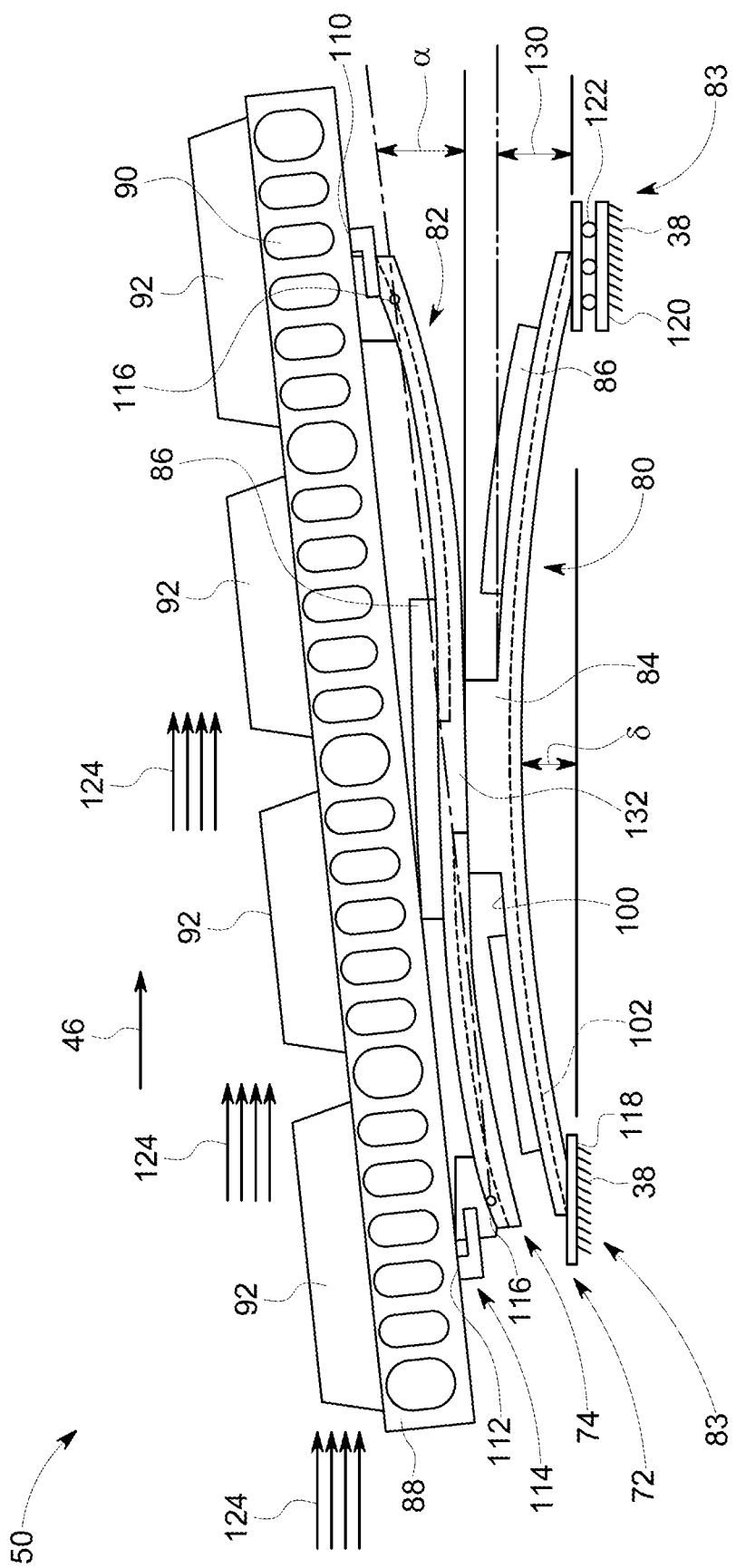
FIG. 3B is a schematic side view of the cooler of FIG. 3A in a second position according to an embodiment of the invention.

Referring now to FIGS. 3A and 3B, a side view of a typical cooler 50 is illustrated in a first and second position, respectively. Referring to FIG. 3A, the cooler 50 can include two attachment points for mounting the bracket 74 to the cooler 50. A first aft point 110 and a second forward point 112 can define interfaces 114 between the bracket 74 and the cooler 50. The interface 114 can include a hinge 116. The hinge 116 can provide for pivotal movement of the interface 114 between the bracket 74 and the manifold 88, for example.

FIGS. 3A and 3B can include alternative fasteners 83 to what is shown in FIG. 2. More specifically, the fasteners 83 can include a fixed fastener 118 and a movable fastener 120.

The fixed fastener 118 can affix the bracket 74 to the fan casing assembly 38 (FIG. 1), while the movable fastener 120 can provide for movement of the bracket 74 relative to the fan casing assembly 38. Such movement, for example, can be sliding movement utilizing one or more bearings 122. The sliding movement of the movable fastener 120 permits actuation of the cooler 50 between the first and second positions.

In the first position shown in FIG. 3A, a cooling airflow 124 as a portion of the airflow 46, can pass into the fins 92 to provide cooling to the a flow of fluid, such as oil, passing through the channels 90 and transferring the heat to the fins 92 for removal by the cooling airflow 124 through convection. In the first position, the fins 92 are in axial arrangement. In such an arrangement, the cooling airflow 124 passes through the forward set of fins 92 first, then interferes with the cooling airflow 124 passing to any aft fins 92. As such cooling effectiveness of the aft fins 92 is reduced.

Referring now to FIG. 3B, the cooler 50 has translated to a second position. In the second position, the lower and upper plates 80, 82 have been translated and rotated based upon a thermal condition. More specifically, a threshold temperature has been met causing the thermally sensitive connector 72 to passively position the cooler 50 into the flow path in response to the increase in temperature. For example, during peak engine operation, the lubricating oil becomes heated and passes to the cooler 50 for cooling. The heightened temperature of the oil passes to the bracket 74, causing an increase in temperature that causes the MMC laminated layer 102 to deform.

More specifically, in the second position, the plates 80, 82 have changed shape or contour, such as having an arcuate or curvilinear shape our contour, after exposure to the thermal condition. The difference between the first position (FIG. 3A) and the second position (FIG. 3B) can be represented by a maximum deflection δ for the lower plate 80 and an angle of attack α for the upper plate 82. The maximum deflection δ can define a radial height 130 as the maximum radial translation of the lower plate 80. The radial height 130 and the maximum deflection δ can translate the cooler 50 and the fins 92 further into the airflow 46 passing through the annular passage 36 (FIG. 1) where the cooler 50 can be exposed to a greater portion of the airflow 46. The movable fastener 120 can permit the translation of the lower plate 80 relative to the surface of the fan casing assembly 38 to which it mounts. The discontinuous layers of temperature-actuated material or MMC 102 form a curvature having an inflection point 132. Such a curvature can orient the upper plate 82 at the angle of attack α. The angle of attack α can be between 0-degrees and 10-degrees, and can be 5-degrees for a typical mounting bracket in one non-limiting example. The angle of attack α can provide an angled orientation for the upper plate 82 to orient the arranged fins 92 at different radial lengths to confront a greater area and volume of the cooling airflow 124. As such, cooling effectiveness of the cooler 50 is increased.

It should be appreciated that while the cooler 50 is in the second position, the aerodynamic drag caused by the cooler 50 is increased as compared to the aerodynamic drag caused by the cooler 50 in the first position (FIG. 3A). After the thermal condition, such as the thermal temperature threshold, is no longer met, the cooler 50 as shown in FIG. 3B in the second position returns to the cooler 50 as shown in FIG. 3A in the first position. As such, the thermal condition can be used to balance a need for cooling by the cooler 50 while minimizing drag when less cooling is needed to maximize fuel efficiency. Thus, the thermally sensitive connector 72 can passively translate and rotate based upon the thermal condition in order to balance the cooling need with minimized aerodynamic drag. The plates 80, 82, for example, can be tailored to translate and rotate the cooler 50 at a particular temperature, such as a higher or maximum demand temperature, such as greater than 200-degrees Fahrenheit for oil cooling, while remaining in an initial position during lesser demand conditions, such as less than 190-degrees Fahrenheit, in non-limiting examples.

The thermal condition and translation of the thermally sensitive connector 72 can be approximately determined using simple variable or uniform cross-section cantilever plate equations and finite element analysis simulations. Closed-form thermal-strain solutions for bi-metal plates were initially used to approximate thermal actuation deflections. In one non-limiting example, the radius of curvature can be represented by variable cross-section cantilever beam equations, such as equation (1):

$$\rho = \frac{t\left[3(1+m) + (1+mn)\left(m^2 + \frac{1}{mn}\right)\right]}{6(\alpha_2 - \alpha_1)(T_h - T_c)(1+m)^2} \quad (1)$$

and the angle of rotation can be represented by equation (2):

$$\sin\theta = \frac{L}{2\rho} \quad (2)$$

where $\rho$ is the radius of curvature, t is the total thickness of the actuation plate 80, 84, m is the thickness ratio of first material to the second material, n is the elastic modulus ratio between the two materials, $\alpha_2$ is the second coefficient of thermal expansion, $\alpha_1$ is the first coefficient of thermal expansion, $T_h$ is the hot temperature, $T_c$ is the cool temperature, $\theta$ is the angle of rotation, and L is the length of the actuation component. Thus, in determining the radius of curvature $\rho$ and the angle of rotation $\theta$, the maximum deflection $\delta$ and the angle of attack $\alpha$ can be determined using equation (2) based upon the determination the angle of rotation $\theta$ for the plates 80, 82. Additionally, the angle of rotation $\theta$, and maximum deflection $\delta$ and the angle of attack a, can be tuned based upon the amount of SiC within the AlSiC layer, in one example.

Figure 4A:
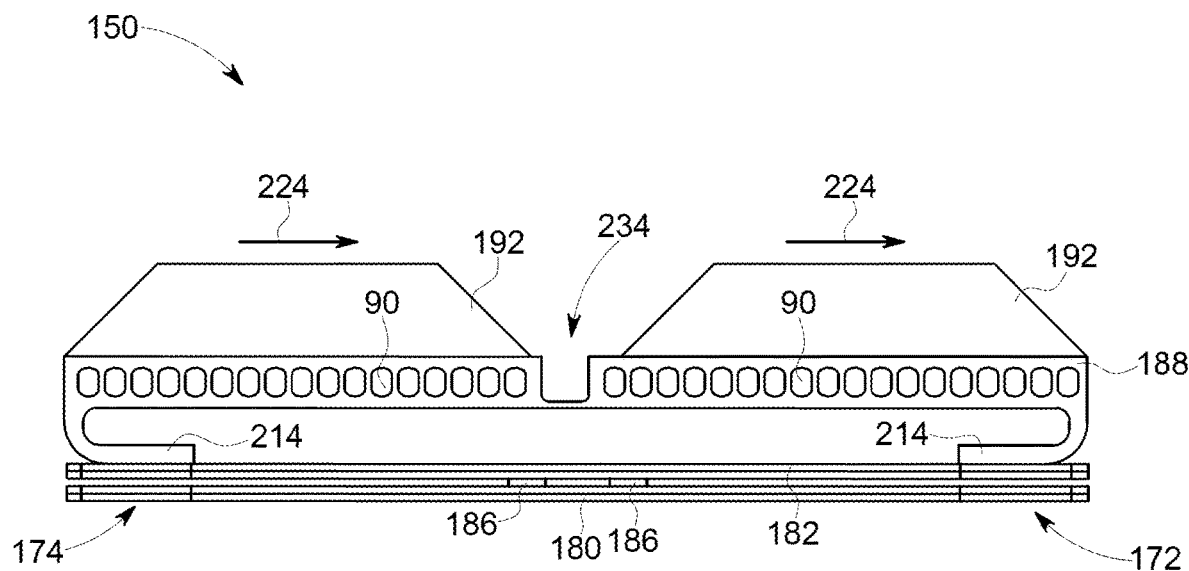
FIG. 4A is a schematic side view of the cooler of FIG. 1 in a first position having a thermally sensitive connector extending in a radial direction according to an embodiment of the invention.
Figure 4B:
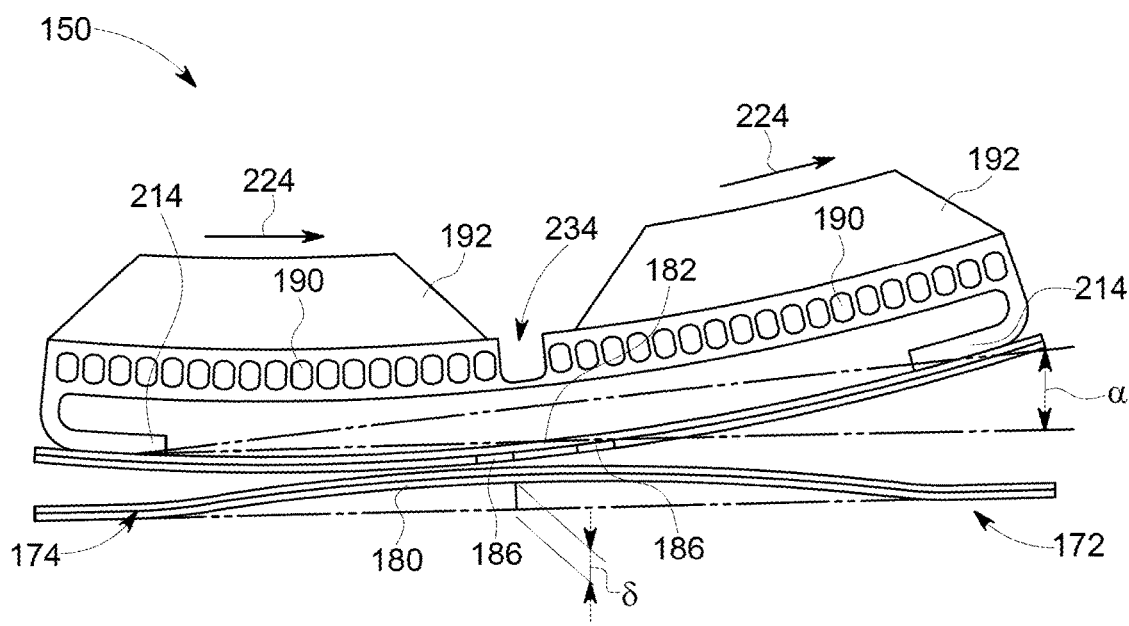
FIG. 4B is a side view of the cooler of FIG. 4A in a second position according to an embodiment of the invention.

Referring now to FIGS. 4A and 4B, another exemplary non-curved panel cooler 150 is shown in a first and second position, respectively. The cooler 150 of FIGS. 4A and 4B can be substantially similar to the cooler 50 of FIGS. 3A and 3B. As such, similar numerals will be used to identify similar element increased by a value of 100.

Referring to FIG. 4A, a bracket 174 can include a lower plate 180 and an upper plate 182. A manifold 188 can include a pair of interfaces 214 integral to the manifold 188. The interfaces 214 can provide an area for coupling the panel cooler 150 to the bracket 174. Furthermore, the interfaces 214 can be made of a flexible material to facilitate rotational and translational deformation of the cooler 150 during actuation of the bracket 174. The upper plate 182 can couple to the interfaces 214, such as by welding in one non-limiting example. The manifold 188 can further include a groove 234 disposed between sets of fins 192. The groove 234 can extend in the circumferential direction, relative to the longitudinal axis or engine centerline, for the length of the cooler 150 in one example. The manifold 188 itself can be made of a locally flexible material or flexural geometry such that it can deform and regain its initial shape. The groove 234 can permit further flexion of the manifold 188.

Upon introduction of the thermal condition, including by way of non-limiting example a first higher temperature threshold, the cooler 150 translates from the first position, shown in FIG. 4A to the second position shown in FIG. 4B. Referring to FIG. 4B, the manifold 188 is deformed from the first position and includes a segmented profile such that the fins 192 confront a greater portion of a cooling airflow 224. The groove 234 can permit greater flexion of the manifold 188 than would otherwise occur. As such, the maximum deflection $\delta$ and the angle of attack a can be less, while the flexion of the manifold 188 permits greater extension of the fins 192 into the cooling airflow 224. The flexion of the manifold 188 can provide for increased deformation of the cooler 150 to confront a greater portion of the airflow 224, as opposed to requiring a greater translation by the bracket 174 to translate the cooler 150 to achieve the same confrontation of the airflow 224. For example, flexion or bending of the manifold 188 can angle the fins 192 to face the airflow 224, as opposed to just an angled disposition within the airflow 224 resultant of the translated bracket 174. As such, the bracket 174 can be adapted to be more sensitive to a change in thermal condition, as the manifold 188 can increase the area or angled orientation of the cooler 150 confronting the airflow 224. Thus, the cooler 150 can be more sensitive to the thermal condition, such as more discrete changes in temperature. A small change in the lower and upper plates 180, 182 can be amplified by the multiple segmentation of the manifold 188 to confront a greater amount of the cooling airflow 224 with a lesser translation by the bracket 174.

Figure 4C:
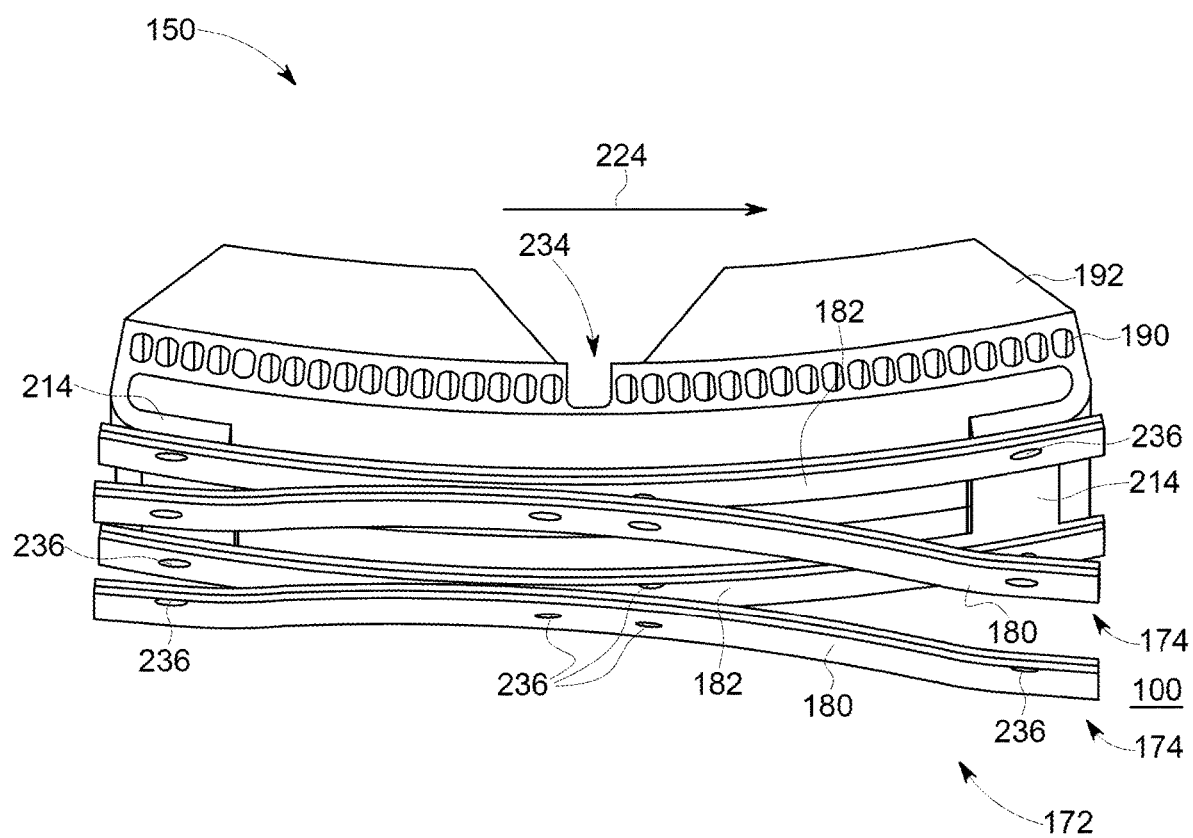
FIG. 4C is a perspective view of the cooler of FIG. 4B illustrating two thermally sensitive connectors in circumferential arrangement.

Referring now to FIG. 4C, a perspective view of the cooler 150 of FIGS. 4A and 4B illustrates multiple brackets 174 having the plates 180, 182 extending in the axial direction, in a substantially circumferential arrangement, relative to the engine centerline or longitudinal axis 12 (FIG. 1). It should be understood that each cooler 150 can have multiple brackets 174, thermally sensitive connectors 172, or plates 180, 182 in order to passively translate the coolers 150 between two or more positions. The plates 180, 182 or the brackets 174 can include multiple holes 236 for coupling a fastener to the bracket 174 for mounting to the fan casing assembly 38 (FIG. 1). It is contemplated that the fasteners used at the holes 236 can include variable lengths to accommodate the translation of the brackets 174 between the first and second positions. Additionally, it should be appreciated that the multiple brackets 174, thermally sensitive connectors 172, or plates 180, 182 can locally or discretely translate the cooler 150 based upon local conditions. For example, the coolers 150 can translate further into the cooling airflow 224 near hotter thermal conditions. In another example, where the cooler 150 is positioned adjacent to a strut (not shown), the cooler 150 could translate, or be designed to particularly translate, based upon the local airflows as generated by the adjacent strut to optimize convective heat transfer while taking advantage of local airflow patterns in order to further minimize aerodynamic drag.

Figure 5A:
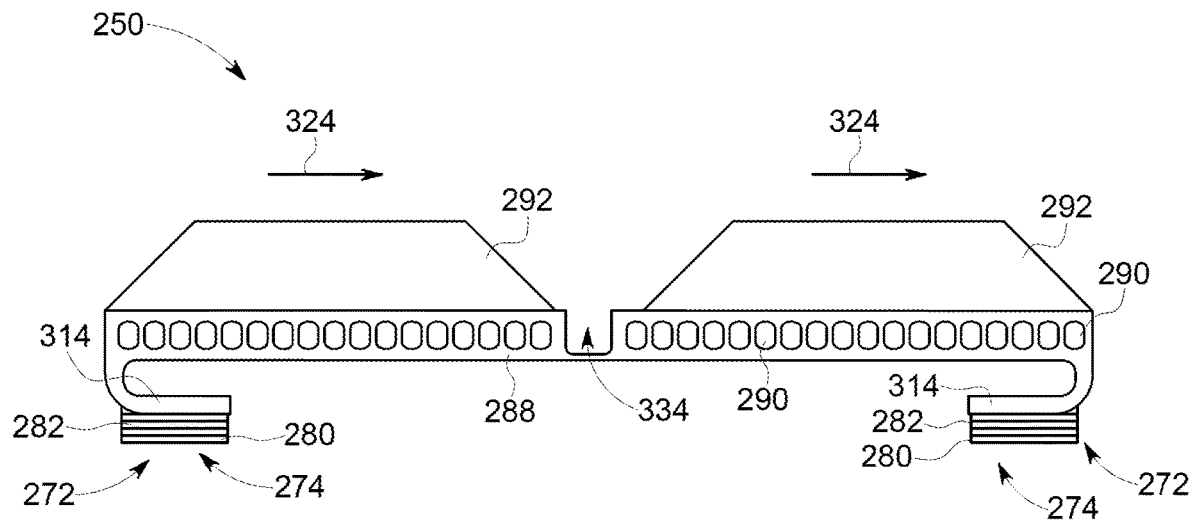
FIG. 5A is a side view of the cooler of FIG. 1 having a thermally sensitive connector extending in the tangential direction in a first position according to an embodiment of the invention.
Figure 5B:
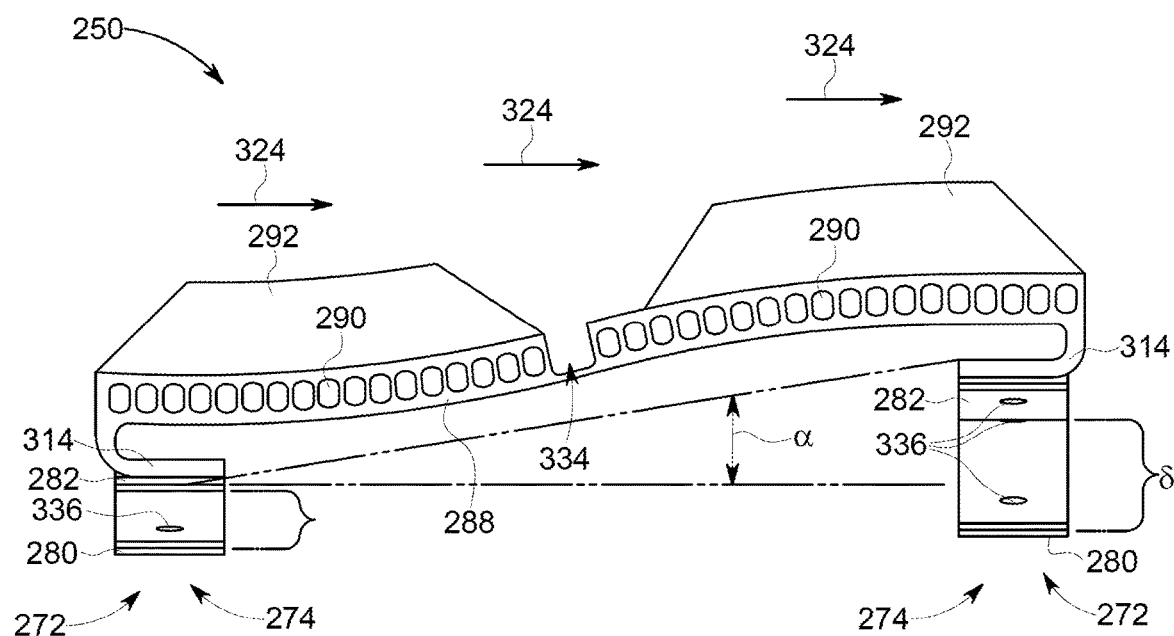
FIG. 5B is a side view of the cooler of FIG. 5A in a second position according to an embodiment of the invention.
Figure 5C:
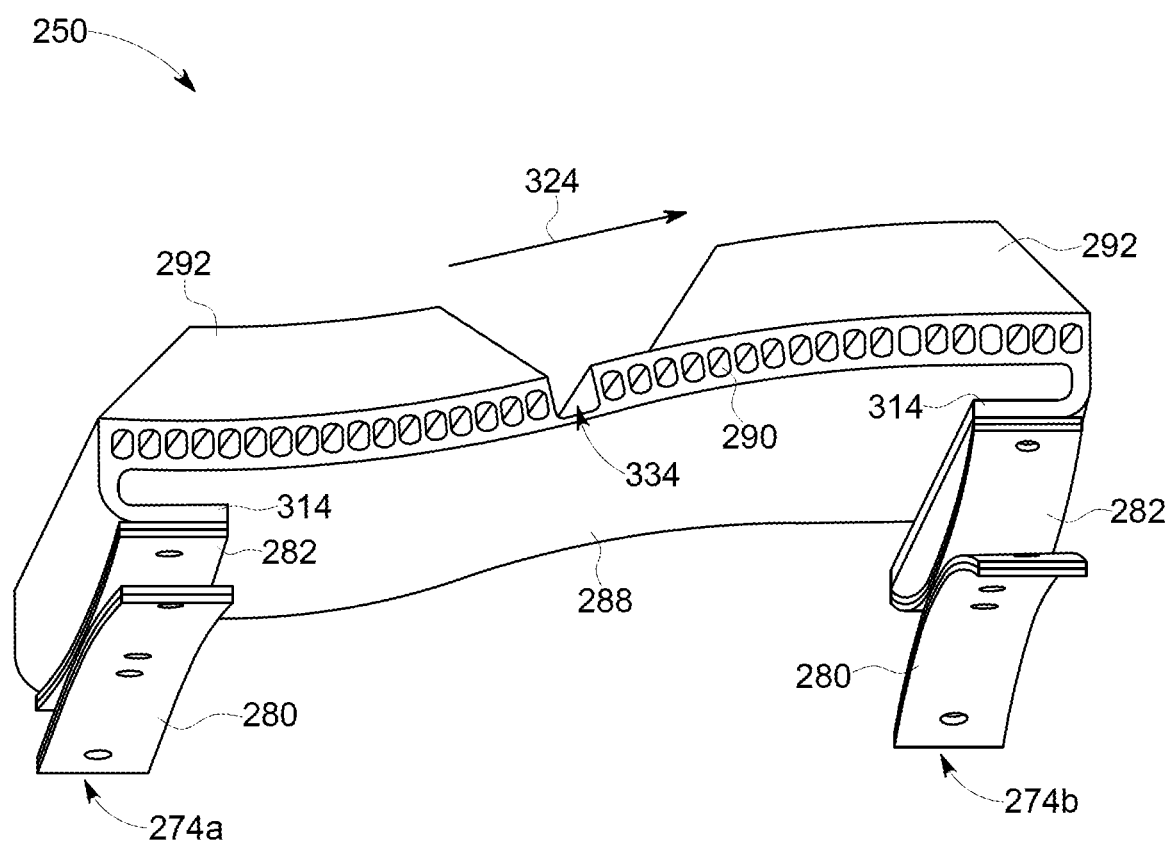
FIG. 5C is a perspective view of the cooler of FIG. 5B better illustrating the shape of the thermally sensitive connectors in the second position.

Referring now to FIGS. 5A-5C, another exemplary cooler 250 is shown. The cooler 250 of FIGS. 5A-5C can be substantially similar to the cooler 150 of FIGS. 4A-4C. As such, similar elements will be identified with similar numerals, increased by a value of one hundred.

Referring to FIG. 5A illustrating the cooler 250 in a first position, thermally sensitive connectors 272 shown as brackets 274 can extend in the tangential or circumferential direction, in axial arrangement, relative to the longitudinal axis 12 (FIG. 1). Each bracket 274 can include a lower plate 280 and an upper plate 282. The brackets 274 can be arranged as a forward bracket 274*a* and an aft bracket 274*b*.

Referring now to FIG. 5B, the cooler 250 is translated into a second position, moving the fins 292 into a position to confront a greater portion of the cooling airflow 324. The forward bracket 274*a* can minimally curve, to position the forward-most fins 292 at an angle, while the aft bracket 274*b* can translate at a greater maximum deflection δ and a greater angle of attack a to expose the aft-most fins 292 to a greater volume of the cooling airflow 324. In the case where there are a greater number of fins 292 or rows of fins 292, the brackets 274 can be adapted to extend further as the coolers 250 extend aft in order to get a greater area of the cooler 250 and a greater number of fins 292 to confront the cooing airflow 324.

Referring now to FIG. 5C, a perspective view illustrates the cooler 250 in the second position. FIG. 5C better illustrates cooler 250 of FIG. 5B, the aft bracket 274*b* being translated further than the forward bracket 274*a*. While it is shown that the lower and upper plates 280, 282 are equally translated, it should be understood that the individual plates 280, 282 can be discretely translated to particularly translate the cooler 250 across a range of thermal conditions, such as a range of temperatures. Across the range of temperatures, the cooler 250 can be tailored to be more sensitive to changes in thermal condition, to better balance a need for cooling with minimizing aerodynamic drag.

It should be appreciated that while four sets of fins are shown in FIGS. 3A-3B and two sets of fins are shown in FIGS. 4A-5C, that any number of fins or sets of fins can be included on the coolers. The scope of this description should not be limited by the number, type, or organization of the fins or any other feature of the fins.

A method of moving a fan casing cooler within a bypass fan duct of an aircraft engine can include passively positioning the fan casing cooler in the annular passage when a first reference temperature is reached. The first reference temperature, in one example, can be a heightened temperature resultant of peak or increasing engine demand conditions, such as during acceleration during aircraft takeoff or maximum thrust. Such peak or increasing condition can generate a greater need for heat transfer from an oil heat exchanger system. The positioning includes a thermally sensitive connector operably coupled to the fan casing cooler to change shape in response to a change in a thermal condition. The fan casing cooler can include any of the fan casing coolers as described herein, such as the cooler 50 of FIG. 2, for example. The fan casing cooler can be passively positioned in the annular passage. Passively positioning can include positioning the cooler in the annular without intended mechanical or electronic initiation by the engine, but by a change in thermal condition local to the thermally sensitive connector, such as a temperature change of the oil passing through the cooler. Additionally, passively positioning the cooler can include translating the cooler into the annular passage, such as translating between the first and second positions shown in FIGS. 3A to 3B, 4A to 4B, and 5A to 5B for example. Furthermore, passively positioning the annular casing cooler can include increasing an attack angle orientation of the cooler, such as increasing the value of the angle of attack a of FIG. 3B in one example. Increasing the attack angle passively positions the cooler or fins to confront a greater volume of air passing through the annular passage to increase the convective heat transfer at the fins.

The method can further include passively retracting the fan casing cooler from the annular passage when a second reference temperature is reached. The second reference temperature, for example, can be a decreased temperature relative to the first reference temperature. The decreased temperature can include an engine temperature at less than peak demand or increased demand conditions, such as a cruise condition for the engine.

The above disclosure provides for an improved design for a surface cooler or heat exchanger for convectively cooling a quantity of fluid transferred from the turbine engine. The cooler includes a bracket for passively positioning, translating, or actuating the cooler to improve convection at the cooler. The cooler is thermally sensitive and passively activated to deploy and optimally position the forced-air cooled heat exchangers into the airflow path of the engine during peak engine conditions. Additionally, such deployment, passive positioning, translating, or actuating can decrease convective cooling by moving the cooler out of the airflow path based upon a decreased demand need in order to minimize aerodynamic drag to improve engine efficiency. As such, it should be appreciated that the cooler is a demand based passive system to selectively position the cooler to increase cooling at the cooler or minimize drag based upon the demand. Thus, the cooler passively balances the need for cooling at the cooler with engine efficiency.

The invention uniquely incorporates the continuous conformal geometric change and actuation directly into the laminate composite metal structure of the heat exchanger or cooler mounting bracket. Differential cooler temperatures, positive or negative, from the stabilized reference temperature, such as the temperature during ultrasonic bonding can be used to continuously change the shape of the bracket. Temperatures above or below the stabilized reference temperature will positively or negatively change the curvature of the cooler. The temperature dependent shape change is controlled and tuned by the laminate geometry and bonding of the aluminum allows with aluminum MMC, AlSiC. Aluminum and AlSiC are chosen for their high strength to density ration and high thermal conductivity. Ultrasonic additive manufacturing is used to laminate the dissimilar materials to produce the bi-metallic effect between high strength aluminum alloy plates and MMC AlSiC. The composition of AlSiC volume fraction percentage of SiC can tune the coefficient of thermal expansion of the bracket. Depending on the percentage of SiC, the coefficient of thermal expansion can vary from 20 to 7 ppm/C in one example. Integration of the actuation design into the mounting bracket allows for use with most bypass air heat exchangers.

The foregoing has described a heat exchanger apparatus comprising an air-cooled oil cooler with a mounting bracket to passively position the cooler into or out of the cooling airflow. While the present disclosure has been described with respect to a limited number of embodiments, those skilled in the art, having benefit of this disclosure, will appreciate that other embodiments can be devised which do not depart from the scope of the disclosure as described herein. While the present disclosure has been described with reference to exemplary embodiments, it will be understood by those skilled in the art that various changes can be made and equivalents can be substituted for elements thereof without departing from the scope of the disclosure. In addition, many modifications can be made to adapt a particular situation or material to the teachings of the present disclosure without departing from the essential scope thereof. For example, the cooler described herein can be configured for use in many different types of aircraft engine architectures, in addition to the example engine describe herein, such as, but not limited to a multi-spool design (additional compressor and turbine section), a geared turbo fan type architecture, engines including un-ducted fans, single shaft engine designs (single compressor and turbine sections), or the like. In addition, the bypass valve disclosed herein will work equally well with other types of air-cooled oil coolers, and as such is not intended to be limited to surface coolers, and can be configured for use in other cooler types, such as plate and fin, tube-fin types, or the like would benefit as well. Further still it will be understood that depending on the internal passage geometry of the valve and the inlet port and outlet port orientations, the flow through the valve can be in-plane (i.e. traverse) or out-of-plane (i.e. axial). Therefore, it is intended that the present disclosure not be limited to the particular embodiment disclosed as the best mode contemplated for carrying out the disclosure. It is, therefore, to be understood that the appended claims are intended to cover all such modifications and changes as fall within the true spirit of the disclosure.

To the extent not already described, the different features and structures of the various embodiments can be used in combination with each other as desired. That one feature is not illustrated in all of the embodiments is not meant to be construed that it cannot be, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A fan casing assembly, comprising:
   a fan casing cooler having a first surface and having a first end spaced from a second end and opposing forward and aft edges mounted to a peripheral wall of an annular fan casing, with the first surface confronting the peripheral wall, with the fan casing cooler defining a flow path along a longitudinal extent of the fan casing cooler between the first end and the second end; and
   a connection assembly mounting the fan casing cooler to the annular fan casing and where the connection assembly includes at least one thermally sensitive connector comprising a bracket having a body mounting the fan casing cooler to the annular fan casing, the body configured to passively position the fan casing cooler into the flow path in response to a change in a thermal condition;
   wherein the thermally sensitive connector comprises a bracket having a body formed from a set of metal layers comprising aluminum silicon carbide responsive to change in the thermal condition, where the bracket is mounted to the annular fan casing and the fan casing cooler.

2. The fan casing assembly as claimed in claim 1, wherein the fan casing cooler includes a segmented body and the connection assembly mounts to the segmented body.

3. The fan casing assembly as claimed in claim wherein the bracket has an upper plate and a lower plate.

4. The fan casing assembly as claimed in claim 3, wherein the lower plate is configured to translate the fan casing cooler vertically away from the annular fan casing in response to the change in the thermal condition.

5. The fan casing assembly as claimed in claim 4, wherein upper plate is configured to increase an attack angle orientation of the fan casing cooler in response to the change in the thermal condition.

6. The fan casing assembly as claimed in claim 4, wherein the lower plate and the upper plate include a thermally conductive layer and a thermally actuable layer.

7. The fan casing assembly as claimed in claim 3, wherein the bracket further comprises an intermediate section coupling the upper plate and the lower plate.

8. The fan casing assembly as claimed in claim 3, wherein the bracket extends forward to aft at least partially along the fan casing cooler and attaches to the fan casing cooler at a first aft point and a second forward point.

9. The fan casing assembly as claimed in claim 1, wherein the fan casing cooler comprises a hinge located at an interface with the bracket.

* * * * *